UNITED STATES PATENT OFFICE.

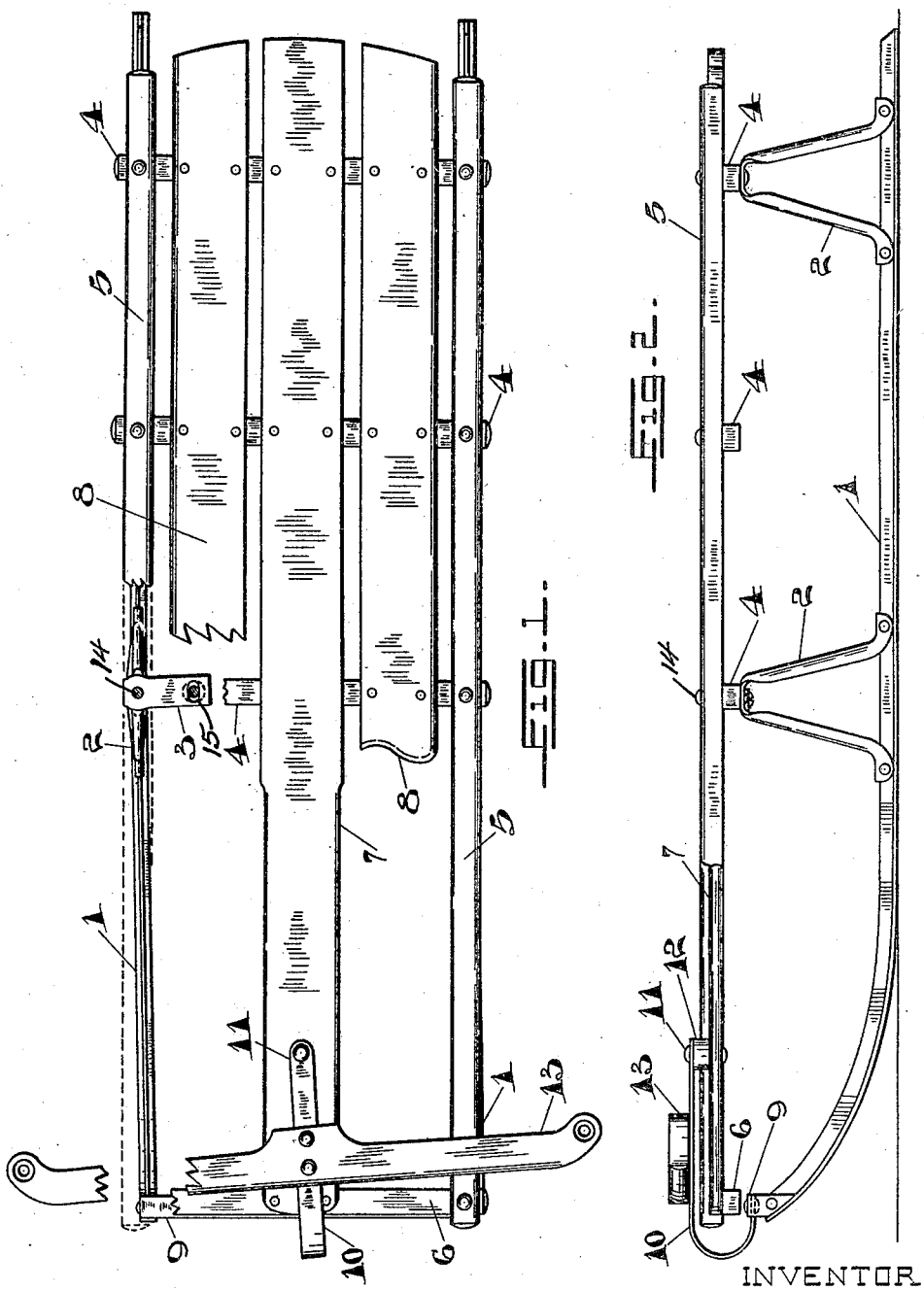

HUGH HYNDMAN, OF PALMERSTON, ONTARIO, CANADA.

SLED.

1,417,172.   Specification of Letters Patent.   Patented May 23, 1922.

Application filed April 26, 1921. Serial No. 464,686.

*To all whom it may concern:*

Be it known that I, HUGH HYNDMAN, of the town of Palmerston, in the county of Wellington, Province of Ontario, Canada, have invented certain new and useful Improvements in Sleds, of which the following is a specification.

This invention relates to sleds of the type in which steering is effected by flexing the runners relative to the top of the sled, and my object is to devise a sled of this type which will be very strong and which will possess a maximum of steering effect for its length.

I attain my object by means of the constructions hereinafter described and illustrated in the accompanying drawings in which—

Fig. 1 is a plan view of a sled constructed in accordance with my invention, with part of the top broken away; and Fig. 2 a side elevation with part of one of the side bars of the top broken away.

In the drawings like numerals of reference indicate corresponding parts in the different figures.

1 are the runners, which are preferably of T-section as shown. To these runners are secured the knees 2, preferably formed of stamped up sheet metal riveted to the webs of the runners as shown. These knees have inwardly extending lugs 3 formed thereon to which are secured the cross bars 4. To these cross bars are secured the side bars 5, which extend as far forward as the front ends of the runners and are there secured to the cross bar 6. 7 is the center plank of the top, which is connected to the cross bars 4 and 6. The slats 8 of the top preferably do not extend forward to the cross bar 6. The forward ends of the runners are upwardly curved as usual and to their extreme ends is secured the cross bar 9, which is preferably formed of flat metal with its ends bent down to lie against the webs of the runners and to abut against the flange thereof. These ends are riveted through the webs. A secure connection is thus formed between the ends of the runners. A goose-necked arm 10 is pivotally connected with the center of the cross bar 9 and extends rearwardly above the cross bar 6 and the center plank and is pivoted at 11 to the center plank, being spaced from the center plank by a washer 12 so that it clears the underlying parts.

The steering lever 13 is rigidly secured to this goose necked arm.

It will be noted that the lugs 3 of the forward knees are secured to the cross bar 4 above them by means of two bolts or rivets, the one being in line with the runner while the other passes through a slot 15 at the inner end of the lug. This allows the forward knees to twist relative to the cross bar on the rivets 14 as centers, so that the flexing of the runners under the action of the steering lever extends back of the forward cross bar 4. The steering effectiveness of the runners is thereby increased.

What I claim as my invention is:

A sled comprising normally straight flexible runners; knees secured thereto; main cross bars connected to the knees; side bars secured to the cross bar and extending forward to the forward ends of the runners; a cross bar secured to the forward ends of the side bars; a center plank secured to the main cross bars and the cross bar connecting the forward end of the side bars; a cross bar connecting the forward ends of the runners; a goose neck arm pivotally connected with the cross bar connecting the forward ends of the runners, passing over the cross bar connecting the forward end of the cross bars and pivoted to the center plank behind said cross bar; and a steering lever secured to the goose neck arm.

Signed at Toronto, Ontario, this 11th day of April, 1921.

HUGH HYNDMAN.